United States Patent [19]

Lesaint

[11] 4,142,810

[45] Mar. 6, 1979

[54] RAPID FIXING DEVICE FOR AN ELECTRICAL CONNECTOR AND AN ELECTRICAL CONNECTOR COMPRISING THIS DEVICE

[75] Inventor: Emile Lesaint, Suresnes, France

[73] Assignee: Socapex, Suresnes, France

[21] Appl. No.: 744,278

[22] Filed: Nov. 23, 1976

[30] Foreign Application Priority Data

Nov. 28, 1975 [FR] France ................. 75 36608

[51] Int. Cl.² .................................... F16B 9/00
[52] U.S. Cl. ................... 403/252; 403/255;
339/125 R; 24/213 B
[58] Field of Search .............. 339/119 R, 125 R, 128;
248/DIG. 6; 85/11; 403/252, 255, 201, 408;
24/213 B, 73 SM

[56] References Cited

U.S. PATENT DOCUMENTS

| 2,041,335 | 5/1936 | Hall ................................ 403/408 X |
| 2,077,120 | 4/1937 | Lombard .......................... 24/213 B |
| 2,090,167 | 8/1937 | Wiley ............................... 24/213 B |
| 2,143,605 | 1/1939 | Lombard ........................... 85/5 R |
| 2,169,708 | 8/1939 | Callaghan ......................... 24/213 B |
| 2,664,550 | 12/1953 | Howard ............................. 339/128 |
| 3,246,320 | 4/1966 | Houbolt .......................... 339/128 X |
| 3,601,770 | 8/1971 | Bowley ........................... 339/125 R |
| 3,975,076 | 8/1976 | Shida .............................. 339/125 R |

FOREIGN PATENT DOCUMENTS

| 8530 | 3/1956 | Fed. Rep. of Germany .......... 403/252 |
| 829099 | 3/1938 | France ............................... 24/213 B |

Primary Examiner—Andrew V. Kundrat
Attorney, Agent, or Firm—Cushman, Darby & Cushman

[57] ABSTRACT

A device for rapidly fixing a connector in openings formed in a wall, comprising on the one hand, in an insulating block (1) of the connector forming the socket, a recess (2) which opens onto the lower surface opposite the opening in the wall and which is provided with anchoring lugs (61) and (62) and, on the other hand, an elastic fastener with two hooks (6) and (7) arranged parallel to one another in the manner of scissor blades, the fastener being anchored in the recess (2) by the penetration of lugs (30) into the gaps (63) (64), where they are held by the elasticity of the assembly zone (15).

16 Claims, 18 Drawing Figures

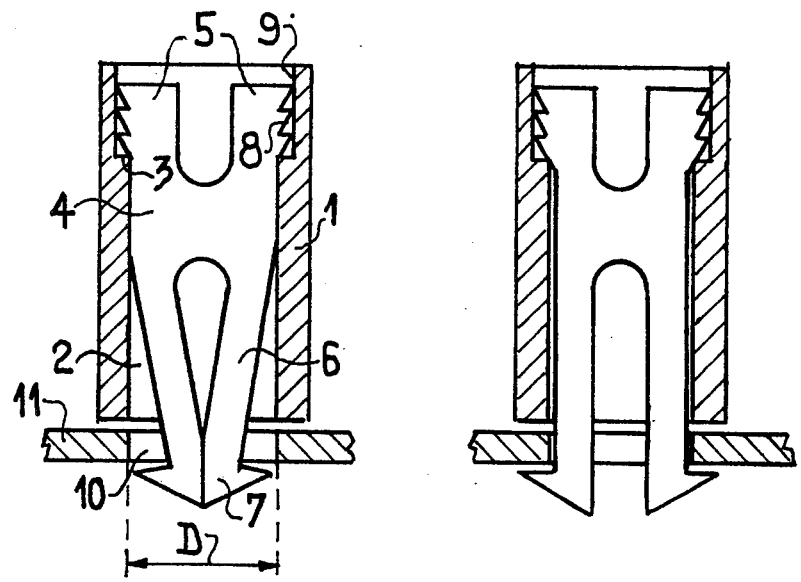
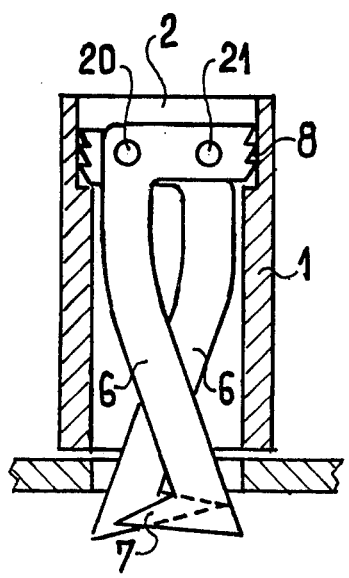

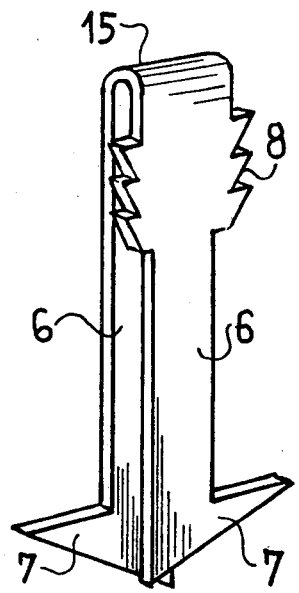
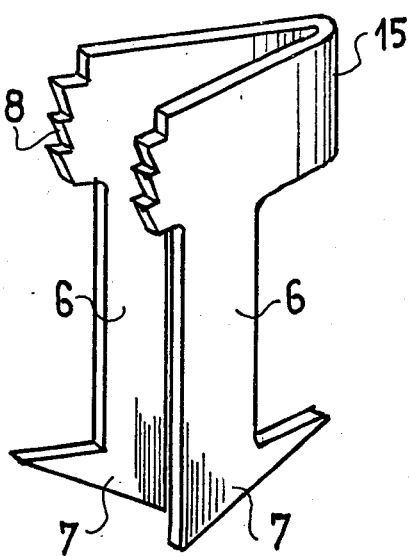
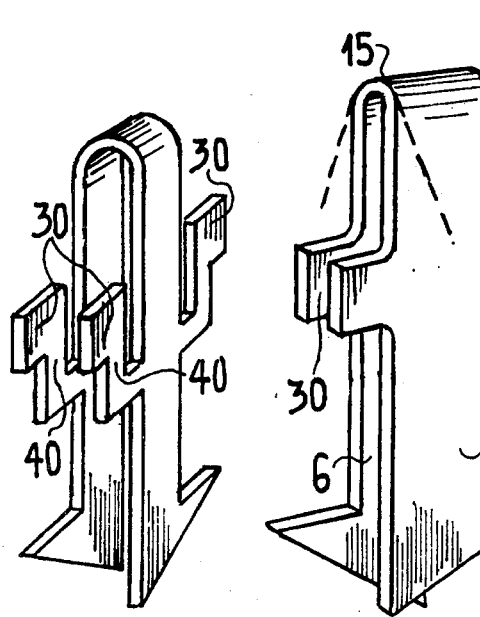
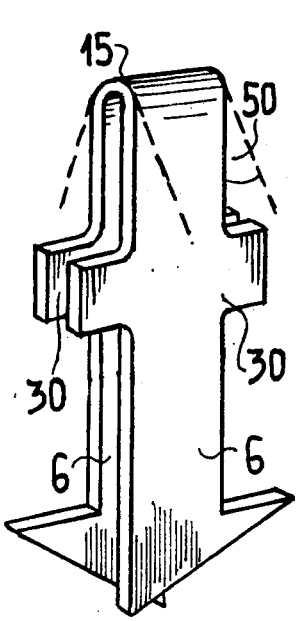
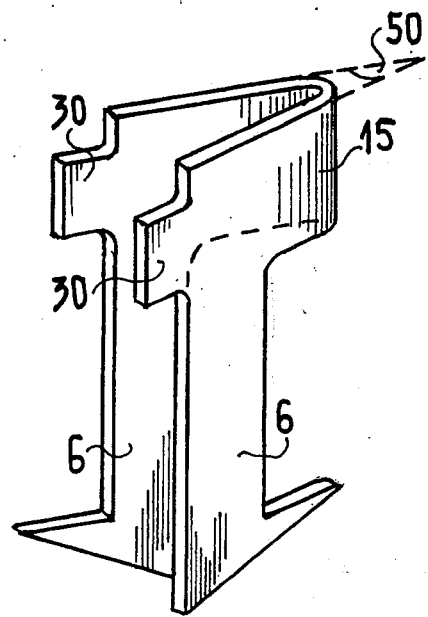

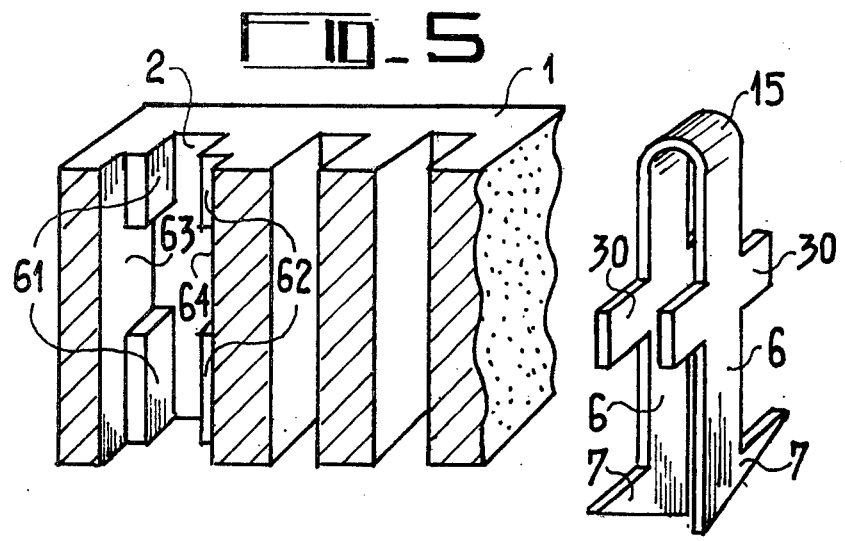
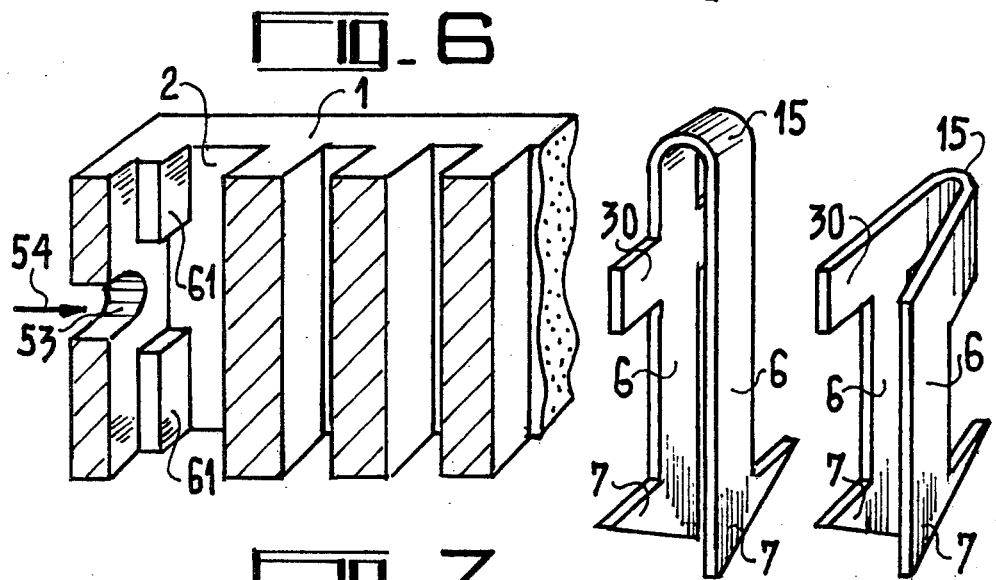
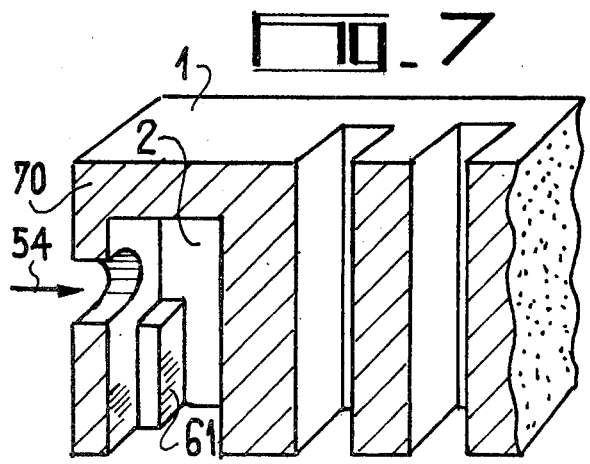

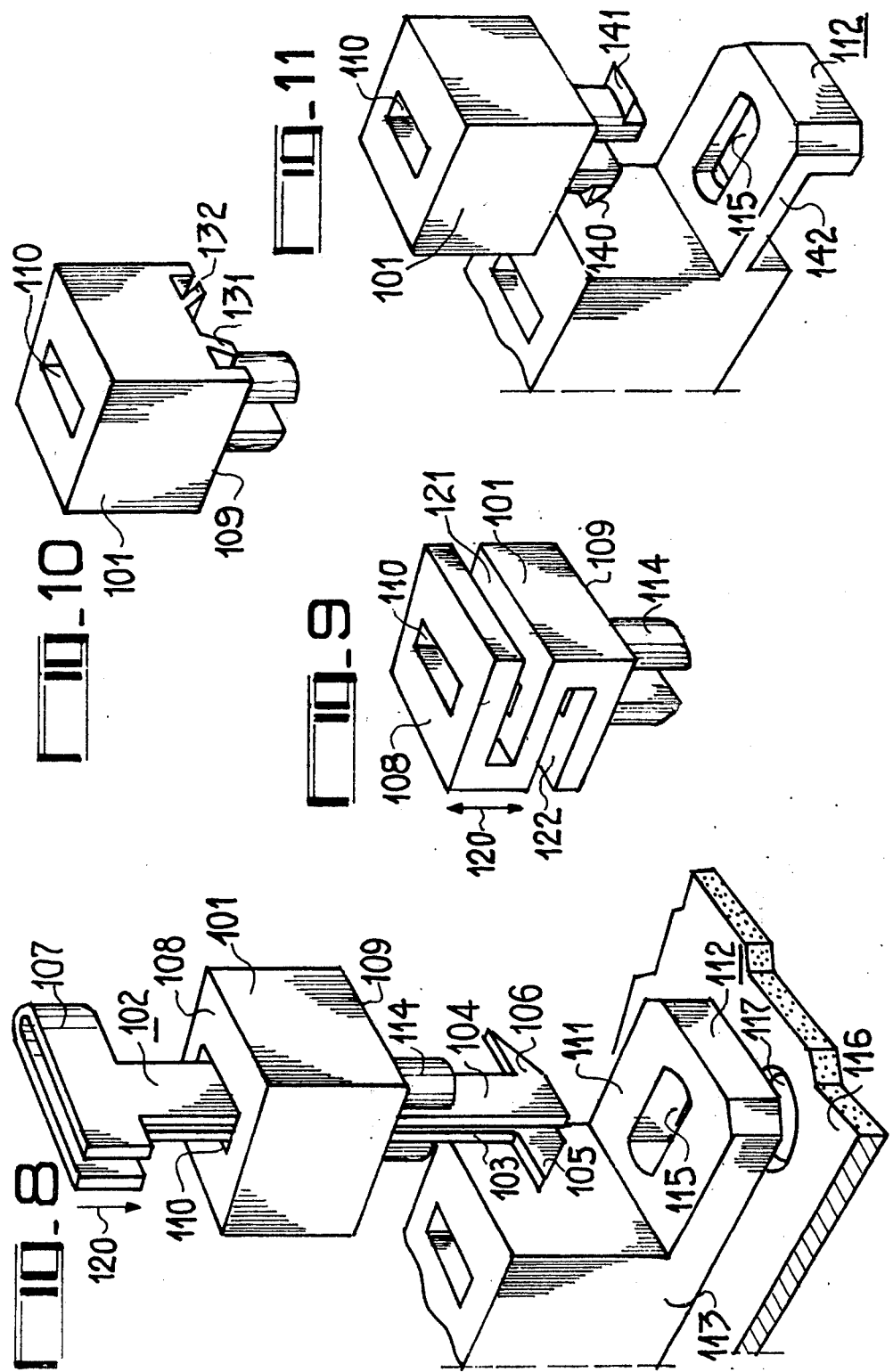

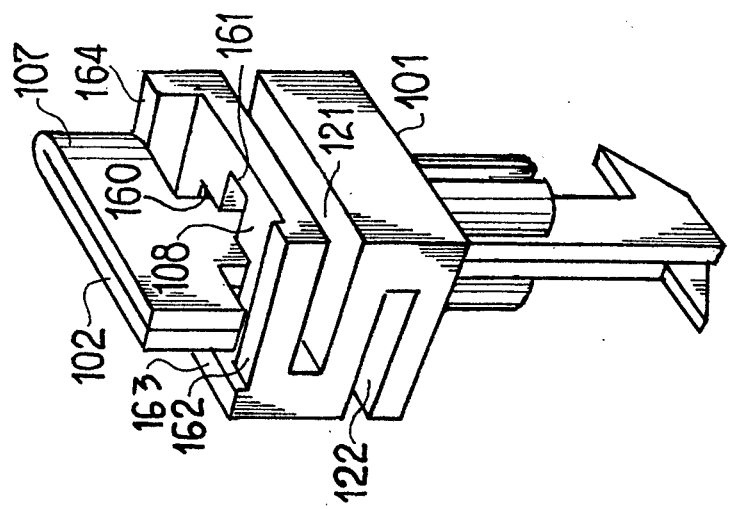
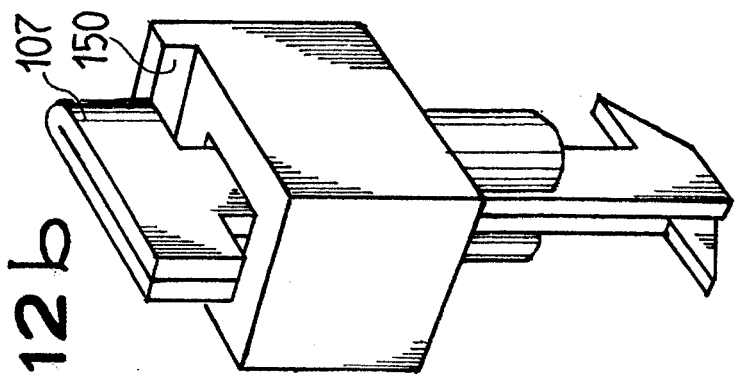
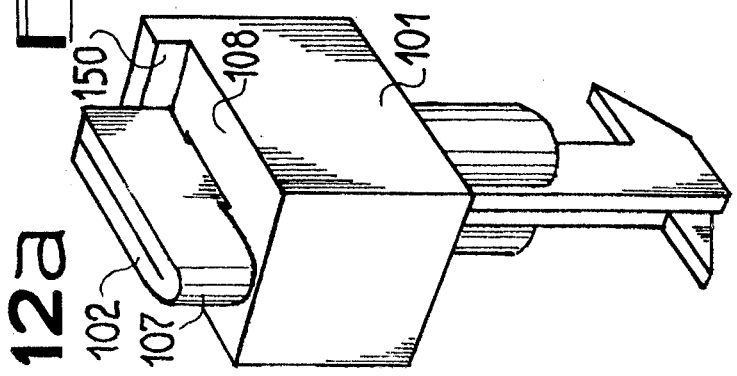

RAPID FIXING DEVICE FOR AN ELECTRICAL CONNECTOR AND AN ELECTRICAL CONNECTOR COMPRISING THIS DEVICE

This invention relates to the field of electrical components known as connectors. These connectors are in two parts, of which one, known as the wandering plug, is integral with the electrical circuit to be connected whilst the other part, known as the fixed socket, is generally integral with a chassis carrying fixed circuits.

Each part consists of a support made of an insulating material and of a plurality of conductive elements or contacts, the contacts of the wandering plug being of a given type, for example of the male type, whilst those of the socket are of a complementary type, for example of the female type.

Fixing the sockets to the chassis is a problem, the known solutions to which are generally attended by a certain number of disadvantages, especially in cases where, for example, rapid assembly and dismantling is necessary, which rules out fixing by means of screws and nuts, or even in cases where the wall provided for fixing is only accessible from one side.

For cases such as these, it has been proposed to use fixing devices generally in the form of hooks which are fixed to that surface of the socket situated opposite the wall of the chassis where it is intended to fix the socket and which are deformable so that, in a first retracted state, they lend themselves to introduction into complementary openings provided in the wall and, in a second expanded state, rest on the rear surface thereof and cannot be withdrawn from the socket to which they are fixed.

However, hook-type fastenings are also attended by specific disadvantages which become noticeable when the mechanical stresses to which the socket may be subjected in use, especially under vibration, exceed the mechanical fixing possibilities of the deformable hooks. These possibilities may be improved by giving the hooks larger dimensions so that the length over which they rest on the rear surface of the wall of the chassis where fixing is to be carried out is itself greater.

However, this enlargement is in many cases limited by the dimensions of the opening formed in the wall which in turn are often determined by the practical applications.

In order to obviate this disadvantage, it has been proposed to use two opposite hooks in each opening. However, since each hook is formed on the one hand by an elastic base lever and, on the other hand, by a coupling nose of which the contact length essentially determines the mechanical limit of the completed fixing, it is necessary, in order to obtain a maximum contact length in an opening of given dimensions, to arrange the coupling noses in such a way that their lateral surfaces are situated side-by-side, the base levers being disposed in the manner of the two blades of a pair of scissors.

In order in practice to produce a pair of hooks of this type, to which antagonistic forces are applied both during their retraction and during their expansion, it is necessary for the respective base levers to be made integral at their ends opposite the ends carrying the coupling noses because, if they are separately made and independently anchored in the insulating block of the supporting socket, the forces applied to the anchorage by one of the levers, which are not balanced out by the oppositely directed forces applied by the other lever, will rapidly endanger this anchorage.

One embodiment of an integral construction such as this may be represented by the assembly, for example by welding or riveting, of two single hooks with their opposite coupling noses. However, a construction such as this is laborious to produce on an industrial scale, requires skilled labour and, hence, is expensive.

The rapid fixing device for connectors according to the present invention does not have any of these disadvantages. The two hooks are rendered integral in a common assembly zone at their respective ends opposite the coupling noses, the two hooks and their assembly zone being integrally made of a single elastic material and being referred to hereinafter, in the interests of simplicity, by the term "fastener".

In addition, in one preferred embodiment, the assembly zone, by virtue of its elasticity, is used for a second function, namely anchoring the elastic assembly in a recess formed in the insulating block of the socket. After being introduced in a state of compression into this recess, the assembly zone then assumes its expanded state and the anchorage may be improved by forming in the recess internal lugs acting as retaining stops for parts of the fastener.

According to the invention, it is provided rapid fixing device for electrical connectors, in one wall provided with fixing openings, said connector comprising in particular a socket formed by a block of insulating material having a fixing surface and lateral surfaces, said device being formed on the one hand by a plurality of hooks of which the introduction and displacement parallel to a common plane in said openings ensures said fixing, and on the other hand by means for rendering said hooks integral with said block, co-operating means respectively carried by said hooks and said block, said hooks, of which each comprises a base lever and a coupling nose, being assembled in pairs with their opposite coupling noses by a link nember which joins that of the ends of their base lever which is opposite said noses, wherein said hooks have at least one common part in projection on said plane of displacement, their link member being made of one and the same material and in one piece with said hooks.

The present invention will be better understood from the following description in conjunction with the accompanying drawings, wherein:

FIGS. 1A and 1B are sections through a conventional fixing device;

FIG. 2 is a section through another conventional fixing device;

FIGS. 3A and 3B show embodiments of a fastener of the fixing device according to the invention;

FIGS. 4A, 4B and 4C show embodiments of the device according to the invention;

FIGS. 5A, 5B, 6A, 6B, 6C and 7 show variants of the device according to the invention;

FIG. 8 is a perspective view of the rapid fixing device provided with a supporting block;

FIGS. 9 to 11 show three embodiments of the supporting block with elastic regions.

FIGS. 12A, 12B and 13 show two variants with supporting ledges.

FIG. 1 is a section through a connector provided with a conventional fixing device.

A recess 2 provided with contact surfaces or stops 3 is formed in the insulating block of a connector socket 1. The fastener, which is cut out from a flat sheet of an elastic material, comprises a base 4 carrying on one side, anchoring tabs 5 and, on the other side, two hooks of which each is formed by a base lever 6 and a coupling nose 7. If necessary, indentations 8 may be provided to ensure the definitive anchoring of the tabs 5 in the walls 9 of the recess.

The introduction of the fastener into the opening 10 of the wall of the chassis where it is desired to fix the connector is obtained by resting the coupling noses 7 on the sides of the opening 10, the inclined surfaces of these noses causing the noses to retract until they come into contact with the base levers, in which position the minimum distance between the ends of the noses should be at most equal to the width D of the opening 10. The supported length of the coupling noses is thus limited to a value which, as mentioned above, is inadequate for numerous practical applications.

FIG. 2 is a section through a connector provided with another conventional fixing device. The same elements being denoted by the same reference numerals, the fastener is formed by the assembly of two opposite hooks but, in the present case, with their base levers arranged side-by-side in the manner of the blades of a pair of scissors. In order, as explained above, to compensate the antagonistic forces, the two base levers are joined by rivets, such as 20 and 21, connecting the ends of the base levers together. Anchorage is obtained by indenting these ends (indentations 8) which may be definitively obtained in a press.

The side-by-side arrangement of the levers makes it possible to use coupling noses of which the supported length is considerably greater (approximately twice) than that encountered in the arrangement shown in FIG. 1.

However, joining two separate hooks together has the disadvantages referred to above.

FIG. 3 shows a first embodiment of the fastener of the rapid fixing device according to the invention.

The fastener is formed, on the one hand, by two hooks each consisting of a lever 6 and a coupling nose 7, and by an assembly zone 15 joining the levers at that end opposite the end carrying the hooks. This assembly zone is made in one piece with the hooks and of the same elastic material. The fastener as a whole is preferably formed by cutting from a flat sheet, followed by folding, to obtain the required scissor blade configuration.

The elasticity of the assembly zone 15 advantageously contributes towards improving the elasticity of the base levers 6 of the fastener. In addition, it keeps the opposite parallel surfaces of the hooks apart from one another, thereby reducing any possible friction.

Finally, anchorage in the insulating block of the socket is ensured by indentations, such as 8, as already mentioned.

The variant (a) is folded along a straight line parallel to the assembly levers. The variant (b) is folded along a straight line perpendicular to those levers. This variant is particularly advantageous from the production point of view because it enables a continuous band of limited width to be cut with minimal losses of material.

FIG. 4 shows another embodiment of the rapid fixing device according to the invention. In this embodiment, the fastener is anchored by lugs 30 which are formed on the fastener and which are designed to co-operate with internal lugs of complementary shape formed in the recess of the insulating block of the socket. These internal lugs will be described hereinafter.

In variant (a), the lugs 30 are fixed elastically to the fastener by way of elastic tongues 40.

In variants (b) and (c), the advantageous application of one of the features of the invention does not require the presence of these elastic tongues.

To this end, the elastic part of the fastener, by which the hooks are assembled, is folded in such a way that the levers form an angle 50 when the fastener is free.

During introduction into the recess, the part 15 is compressed, the levers become substantially parallel and the elastic expansion force thus created ensures that the lugs 30 bear against the walls of the recess where the internal lugs are formed of which several variants will now be described.

FIG. 5 is a perspective view in section of an insulating block of a connector socket provided with a recess which forms part of the fixing device according to the invention.

The recess 2 designed to receive the fastener is provided with pairs of lugs, such as 61 and 62, which are arranged opposite one another and between which the lugs 30 of the fastener shown in FIG. 4 are designed to engage. The fastener according to (c) in FIG. 4 also bears against these lugs in its assembly zone 15. It should be noted that the compressed fastener may be introduced at either end of the recess.

FIG. 6 is a perspective view in section of one variant of the insulating block of a socket and two variants of the fastener according to the invention. These variants have the advantage of ready removability of the fastener relative to the socket. To this end, the lugs of the recess are formed only on the outside thereof, namely at 61, whilst the lugs 30 of the fastener are only formed on one side thereof. Finally, an opening 53 is formed in the corresponding outer wall of the socket.

When it is desired to withdraw a fastener from the connector, for example to separate the connector from the chassis, the introduction of a rod or tool into the opening 53 in the direction 54 compresses the fastener and releases the lugs 30 from the internal lugs 61, thereby separating the fastener from the connector.

The introduction of a rod or tool into the opening 53 may also be advantageous in cases where the same type of connector has to be fixed to several wall thicknesses.

According to the invention, several groups of staggered, internal lugs are in this case provided in the recess 2 and the rod or tool enables the length of these hooks to be adjusted according to the thicknesses.

FIG. 7 is a perspective view in section of a variant of the insulating block of a socket equipped with the device according to the invention. In this variant, a closed wall 70 shuts off the upper part of the recess 2 from the fastener. So far as the fastener is concerned, this wall acts as a stop having the same function as the group of upper lugs in FIGS. 5 and 6.

According to the orders of magnitude given by way of example, a connector to be fixed in a chassis, of which the necessary fixing openings were circular holes 3.2 mm in diameter, withstood a tractive force of 10 daN per fastener, i.e. almost three times the corresponding value of the conventional fastener shown in FIG. 1.

FIG. 8 represents, in a perspective view, the rapid fixing device, according to the invention, comprising a supporting block;

The adding of this supporting block brings about an advantageous extension of the field of applications of the embodiments above described, and illustrated on FIGS. 3 to 7.

In fact, the use of fasteners in accordance with these figures means that the insulating block of the socket has to be provided with recesses specially designed to receive the fasteners.

This necessity involves a possible limitation in the field of practical applications of the invention, in that the connectors have been used very extensively in practical applications in a form in which they are fixed in the hardware in question by lateral parts which are generally made of the same material as the insulating block of the socket and which are formed with holes intended to receive fixing screws or bolts.

On an industrial level, therefore, the manufacture of sockets of the type in question has for some time necessitated the production of very expensive high-precision moulds in which the lateral parts provided with holes are formed. In the interests of simplicity, these lateral parts provided with holes will be referred to hereinafter as fixing lugs. In addition, the lengths adopted for the connectors is limited to a small number of standardised values in order to reduce the corresponding production costs.

Accordingly, an industrial situation such as this would have the disadvantage of possibly limiting the advantageous utilisation of the invention according to the FIGS. 3 to 7, insofar as it would necessitate, on the one hand, the production of new, very expensive moulds and, on the other hand, discouraging users from adopting it in the hope of recovering the costs of the original moulds.

The invention according to FIG. 8 and following obviates this disadvantage. It enables existing connectors of the lateral lug type, to be used and to be benefit from the advantages of the fixing of the fasteners according to FIGS. 3 to 7.

In its principle, the invention directly uses the opening, present in each fixing lug of conventional connectors, for fixing a fastener, and, in order to ensure optimal mutual geometric adaptation of the fastener and the opening, the invention provides for the interposition of an intermediate block or sleeve of which the shape ensures the necessary compensations of dimensions and renders the "plays" negligible.

This device consists of a supporting block 101 and a fastener 102 of the type already described above and illustrated, for example, in FIG. 4C.

A fastener of the type in question comprises two base levers 103 and 104 provided with two coupling noses 105 and 106 assembled in pairs by a link member formed by a U-shaped element with two arms 107, said arms being perpendicular to the base levers.

The supporting block 101, generally parallelepipedic in shape, comprises in particular two principal parallel supporting surfaces 108 and 109 onto which opens an inner passage 110. One of the two principal supporting surfaces 109 is intended to be applied to a surface 111 of the fixing lug 112 of a connector 113 (partly shown). The transverse positioning of the supporting block relative to the lug is ensured by a cylindrical lug 114 of which the outer contour, as seen in cross-section, is substantially equal in its dimensions to the inner contour, as seen in cross-section, of the fixing hole 115 of the lug which, in the case of FIG. 8, is oval. The inner passage 110 extends through the cylindrical positioning lug which is thus divided into two parts.

The rapid fixing device is used as follows:

The connector is in contact with the wall of a chassis to which it is to be fixed. The hole 115 of its fixing lug is situated opposite an opening 117 similar in size to the hole 115 formed in the wall. The supporting block is then placed on the fixing lug, the positioning lug 114 projecting into the hole 115 of the fixing lug. The fastener is then introduced into the inner passage 110 with its levers 103 and 104 compressed so that the coupling noses 105 and 106 are retracted within the inner contour of the passage. The longitudinal force exerted in the direction of the arrow 120 keeps the coupling noses in their retracted position as they pass through the wall 116.

Finally, after passing through the wall, the levers 103 and 104 return to their normal shape, and the coupling noses 105 and 106 project beyond the contour of the opening, thus establishing the required fixing.

Thus, the device comprising a supporting block provides for a fixing of the connector to the wall of the chassis, which is identical in quality to that obtained by the fixing device according FIGS. 3 to 7 without any need to use a connector with a particular shape adapted to the fasteners according to the invention.

It is pointed out that the length of the positioning lug 114, of which the function is to centre the inner passage relative to the hole 115 of the fixing lug, is normally less than the thichness of the fixing lug. However, it is possible in a modified embodiment, for the length of the positioning lug to be greater than that thickness which, after fixing, determines its projection from the opening 117 in the wall of the chassis where it is desired to fix the connector. If the respective outer and inner contours of the positioning lug and the opening are of comparable dimensions in regard to cross-section, the positioning lug may additionally perform the function of positioning the connector relative to the chassis.

FIG. 9 shows one particularly advantageous embodiment of the supporting block. This block comprises slots, such as 121 and 122, which are perpendicular to the direction 120 of the forces applied during the positioning and fixing of the connector and, after fixing, to the direction of the forces separating the connector from the wall to which it is fixed.

The effect of using these slots is that it is possible for the two principal surfaces 108 and 109 of the supporting block to be brought together with elastic restoring forces which, after fixing, tend to apply the connector to the wall. Two advantages are afforded by this mechanism, namely on the one hand, the possibility of fixing a connector to walls with different thicknesses comprised within two limits associated with the elasticity limits of the supporting block, and on the other hand high stability of the completed fixing in applications where the chassis to which the connectors are fixed are subjected to mechanical vibrations. FIG. 10 shows a variant of the embodiment illustrated in FIG. 2 where the elastic forces applied are obtained by using elastic tongues, such as 131 and 132, which normally project beyond the outer contour of that of the principal supporting surfaces 109, namely the lower surface, which is designed to be brought into contact with the fixing lug of the connector, the deformation of this tongue, after contact has been established, causing the necessary elastic forces to be created with the same results as in the case of the device shown in FIG. 9.

FIG. 11 shows another embodiment of the invention relating to the cylindrical positioning lug 114. The outer contour of this lug, as seen in cross-section, is substantially equal in its dimensions to the inner contour, as seen in cross-section, of the hole of the fixing lug, and the assembly obtained by penetration of the former into the latter is of the so-called "soft friction" type. Now, in certain applications, in particular when the connector is to be fixed to a vertical wall, it can be extremely useful for the supporting block to be rendered integral with the connector, even before the connector is fixed to the wall.

A first arrangement consists in creating a negative "play" between the two elements which leads to an assembly of the so-called "hard friction" type and which makes use of the inherent elasticity of the constituent material of the positioning lug increased by the presence in it of the longitudinal slots.

A second arrangement, shown in FIG. 11, ensures greater solidarity. It consists essentially in the use of lateral bolts 140 and 141 which are carried by the positioning lug and which, in the retracted position, may pass through the hole 115 of the fixing lug 112 in order subsequently to spread apart and rest on the opposite surface of the fixing lug. In a modified embodiment shown in FIG. 11, this surface of the fixing lug is reduced in thickness at 142 to support the bolts without the bolts projecting beyond the lower plane of the said surface of the fixing lug.

This part, of reduced thickness, may be produced by a simple industrial operation which may be carried out on the moulded connectors used without adding appreciably to their total retail price.

FIG. 12 shows another variant of the invention which is intended to produce the required fixing in the case of walls having two different thicknesses.

In order to obtain this result, use is made of the fact that the fastener 102 may be positioned in the inner passage in two directions at 180° from one another, and the supporting block is provided with a ledge 150 projecting on one of the sides of the upper principal surface 108. For a given orientation of the fastener, its common assembly zone 107 rests on the principal surface 108 (FIG. 12a). For the opposite orientation, this zone rests on the projecting ledge 150 (FIG. 12b). The connector may thus be fixed for the respective cases of two walls of which the thicknesses differ by the height of this ledge.

FIG. 13 shows another modified embodiment en which all the means described above and illustrated in FIGS. 9 and 12 are simultaneously used. In this case, the inner passage characteristic of the invention extends in two directions 160 and 161 situated at 90° from one another, allowing four separate positions for the fastener 102, whilst the supporting block 101 is equipped with elasticity slots 121 and 122. Finally, the upper supporting surface 108 is provided on three sides with ledges 162, 163 and 164 of different heights, on which the assembly zone 107 of the fastener may rest.

Under these conditions, the fixing device according to the invention may in practice be adapted to any value selected freely from a wide range of chassis wall thicknesses, the elasticity of the supporting block enabling intermediate heights comprised between two fixed values of the respective heights of the ledges to be obtained.

It is also pointed out that the limited number of the heights of the ledges may be increased by providing the ledges with a supporting surface which, instead of being parallel to the principal supporting surface 108 of the supporting block 101, is of progressively variable height, providing them with a generally helical shape and, in association with a cylindrical inner passage, allowing fixing to be obtained for a wide range of chassis wall thicknesses simply by rotating the fastener about the axis of that passage without any need for an elastic supporting block.

In this case, excellent vibration resistance may with advantage be obtained by means of retaining gaps distributed over the helical ledge and co-operating with the assembly zone which may rest thereon, as in a toothed rack.

It is also pointed out that, in all the embodiments described just above, the upper principal supporting surface is geometrically clear, the fastener projecting relative to it. However, it is also possible in accordance with the invention to provide, around this surface, lateral walls with a height such that the upper part of the fastener is accommodated within the cavity thus formed. A suitable choice of the height of the walls thus provides for the advantageous result of a visual indication of correct estableshment of the fixing, the fastener projecting beyond the upper edge of the cavity in the opposite case.

Finally, it is pointed out that, although the fastener has been shown as being independent of the supporting block in the FIGS. 8 to 13 and in their description, the features relating to the anchorage of the fastener by lateral indentations, such as those described in and illustrated in FIG. 3(b), form part of the present invention.

"Of course the invention is not limited to the embodiments described and shown which was given solely by way of example".

What is claimed:

1. In combination, an electrical connector, and a rapid fixing device for fixation in one wall of said connector which is provided with fixing openings, said connector comprising a socket formed by a block of insulating material having a fixing surface and lateral surfaces, said device being formed on the one hand by a plurality of hooks of which the introduction in said openings ensures said fixing, and formed on the other hand by means for rendering said hooks integral with said block, said means respectively carried by said hooks and said block, each hook comprising a base lever and a coupling nose, assembled in pairs with their opposite coupling noses, by a link member joining the base levers at their ends opposite said noses, in an overlapping arrangement, their link member being made in one piece with and from the same material as said hooks, wherein said link member is formed by an element with two arms in the form of a U, said arms being perpendicular to said base levers.

2. In combination as claimed in claim 1, wherein said means is carried on the one hand by the hooks as lugs on only one of the two base levers of each pair of hooks, while the co-operating means, carried on the other hand by the block comprise recesses which open onto at least said fixing surface and which are provided with internal supporting lugs on one of their walls forming one of said lateral surfaces, said lateral surface being provided with an opening for the introduction of a tool.

3. In combination as claimed in claim 1, wherein said co-operating means carried on the one hand by the hooks comprise a plurality of lugs perpendicular to the base levers while the co-operating means carried, on the other hand, by the block comprises recesses which open at least onto said supporting surface and which are provided with internal supporting lugs on two opposite walls.

4. In combination as claimed in claim 3, wherein said lugs perpendicular to the base levers are fixed to the hooks by elastic means.

5. In combination in claim 3, wherein said internal supporting lugs are arranged in said recesses in several stages distributed perpendicularly of said fixing surfaces.

6. In combination as claimed in claim 3, wherein the arms of said link member form with one another an angle other than 0 degrees before said hooks are introduced into said recesses.

7. In combination as claimed in claim 1, wherein said means carried by the block are formed, on the one hand, by fixing lugs of given thickness provided with a hole and, on the other hand, by an intermediate block comprising two principal parallel supporting surfaces and an inner passage opening into those surfaces, one of the two surfaces, namely the upper surfaces, ensuring said support with said co-operating means carried by said hooks, and the other of the two surfaces, namely the lower surface ensuring said support on one of said lugs.

8. In combination as claimed in claim 7, wherein said lower surface comprises a positioning lug through which said inner passage extends and of which the outer contour, as seen in cross-section, is substantially equal in diameter to the inner contour, as seen in cross-section, of said hole in said fixing lug.

9. In combination as claimed in claim 8, wherein said positioning lug has a height at most equal to said given thickness.

10. In combination as claimed in claim 9, wherein said positioning lug carries lateral hooks projecting beyond its outer contour, as seen in cross-section, and co-operating with recesses in said fixing lugs.

11. In combination as claimed in claim 10, wherein said positioning lug has a height greater than said given thickness.

12. In combination as claimed in claim 7, wherein said intermediate block is provided with resilient means in a direction perpendicular to said principal surfaces.

13. In combination as claimed in claim 12, wherein said resilient means are formed by zones of the intermediate block defined by slots extending in a direction substantially parallel to said principal surfaces.

14. In combination as claimed in claim 7, wherein said resilient means are deformable tongues on the lower principal surface of the supporting block.

15. In combination as claimed in claim 7, wherein said upper surface has several portions of different height ensuring said support with the means carried by said hooks.

16. In combination as claimed in claim 15, wherein said portions are disposed on a helical gradient.

* * * * *